(12) United States Patent
Zuideveld et al.

(10) Patent No.: US 11,186,653 B2
(45) Date of Patent: Nov. 30, 2021

(54) PROCESS OF MAKING POLYOLEFINS

(71) Applicant: SABIC GLOBAL TECHNOLOGIES B.V., Bergen op Zoom (NL)

(72) Inventors: Martin Alexander Zuideveld, Geleen (NL); Bobby Johannes Henricus Hubertus Smeets, Geleen (NL); Thijs Van Mulken, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 177 days.

(21) Appl. No.: 16/494,462

(22) PCT Filed: Mar. 14, 2018

(86) PCT No.: PCT/EP2018/056408
§ 371 (c)(1),
(2) Date: Sep. 16, 2019

(87) PCT Pub. No.: WO2018/167155
PCT Pub. Date: Sep. 20, 2018

(65) Prior Publication Data
US 2020/0087420 A1     Mar. 19, 2020

(30) Foreign Application Priority Data

Mar. 17, 2017  (EP) .................................. 17161664
Sep. 15, 2017  (EP) .................................. 17191276

(51) Int. Cl.
*C08F 2/01* (2006.01)
*B01J 8/10* (2006.01)
(Continued)

(52) U.S. Cl.
CPC .................. *C08F 2/01* (2013.01); *B01J 8/10* (2013.01); *C08F 4/6565* (2013.01); *C08F 110/06* (2013.01)

(58) Field of Classification Search
USPC ........................................ 526/901; 422/137
See application file for complete search history.

(56) References Cited

U.S. PATENT DOCUMENTS 4,101,289 A    7/1978  Jezl et al.
4,414,132 A   11/1983  Goodall et al.
(Continued)

FOREIGN PATENT DOCUMENTS

EP    0019330 A1   11/1980
EP    1283222 A1    2/2003
(Continued)

OTHER PUBLICATIONS

International Search Report for International Application No. PCT/EP2018/056408, International Filing Date Mar. 14, 2018, dated May 29, 2018, 4 pages.
(Continued)

*Primary Examiner* — Fred M Teskin
(74) *Attorney, Agent, or Firm* — Cantor Colburn LLP

(57) ABSTRACT

The present invention relates to a process for the continuous production of a polyolefin, preferably polypropylene, in a horizontal stirred bed polymerization reactor by contacting one or more olefins, preferably propylene, with a catalyst system while stirring, said catalyst system comprising: * a procatalyst comprising i) titanium; ii) a magnesium-containing support, preferably a magnesium chloride-containing support, and iii) an internal electron donor; * optionally an external electron donor; and * a co-catalyst, being a alkyl aluminum catalyst having formula $AlX_nR_{3-n}$, wherein each X is independently a halide or a hydride and wherein n is 0, 1 or 2, preferably 0, and wherein R is an C1-C12 alkyl group, preferably ethyl, wherein the molar ratio of aluminum (Al) from the co-catalyst to titanium (Ti) from the procatalyst (Al/Ti) is at least 75. The present invention also relates to polyolefin prepared using said process and a (Continued)

shaped article comprising said polyolefin. The present invention moreover relates to the use of a titanium to aluminum ratio during the Ziegler-Natta polymerization of olefins in a horizontal stirred bed reactor to reduce the energy (power) consumption in view of a situation wherein the titanium to aluminum ratio is lower.

17 Claims, 6 Drawing Sheets

(51) Int. Cl.
  *C08F 4/656* (2006.01)
  *C08F 110/06* (2006.01)

(56) References Cited

U.S. PATENT DOCUMENTS

| | | | |
|---|---|---|---|
| 4,978,648 A | 12/1990 | Barbe et al. | |
| 5,077,357 A | 12/1991 | Job | |
| 5,106,806 A | 4/1992 | Job | |
| 5,556,820 A | 9/1996 | Funabashi et al. | |
| 6,799,568 B2 | 10/2004 | Zakharov et al. | |
| 7,238,758 B2 | 7/2007 | Yoshikiyo et al. | |
| 7,947,788 B2 | 5/2011 | Ramjoie et al. | |
| 2010/0099811 A1 | 4/2010 | Kobayashi et al. | |
| 2010/0130709 A1 | 5/2010 | Chen et al. | |
| 2015/0191553 A1 | 7/2015 | Kaur et al. | |
| 2015/0353656 A1* | 12/2015 | Taftaf | C08F 4/649 526/189 |
| 2016/0311947 A1 | 10/2016 | Zuideveld et al. | |
| 2016/0311950 A1 | 10/2016 | Batinas-Geurts et al. | |
| 2016/0326280 A1 | 11/2016 | Batinas-Geurts et al. | |

FOREIGN PATENT DOCUMENTS

| | | |
|---|---|---|
| EP | 1783145 A1 | 5/2007 |
| EP | 2027164 B1 | 8/2012 |
| WO | 9632426 A1 | 10/1996 |
| WO | 9632427 A1 | 10/1996 |
| WO | 9832427 A1 | 7/1998 |
| WO | 2006056338 A1 | 6/2006 |
| WO | 2015002298 A1 | 1/2015 |
| WO | 2015091983 A1 | 6/2015 |
| WO | 2015091984 A1 | 6/2015 |

OTHER PUBLICATIONS

Pullukat, Thomas J. and Hoff, Raymond E., "Silica-Bases Ziegler-Natta Catalystis: A Patent Review", Catal. Rev.-Sci. Eng. 41(3&4), 1999, pp. 389-438.

Written Opinion for International Application No. PCT/EP2018/056408, International Filing Date Mar. 14, 2018, dated May 29, 2018, 5 pages.

* cited by examiner

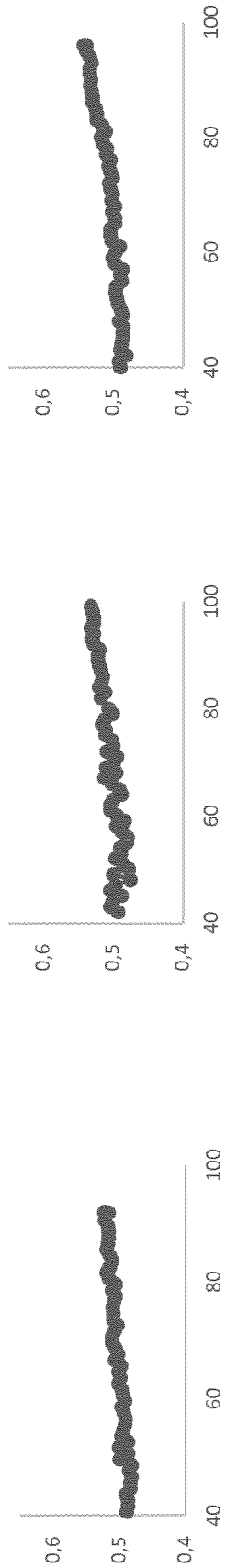
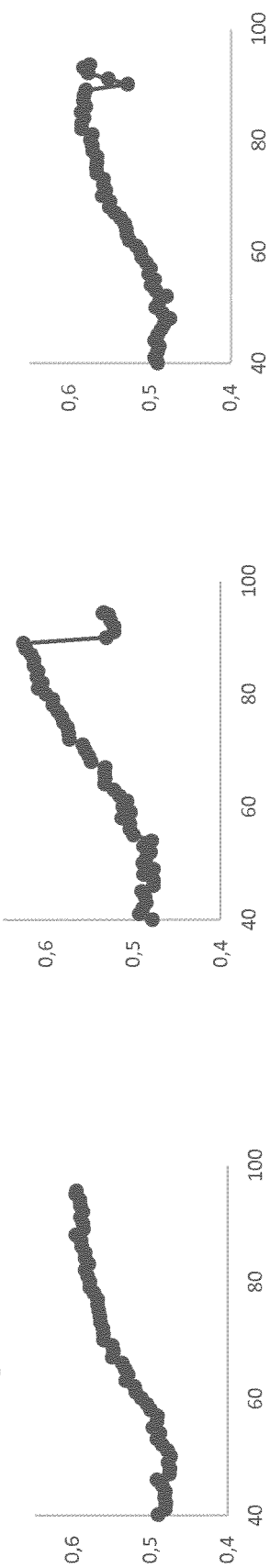

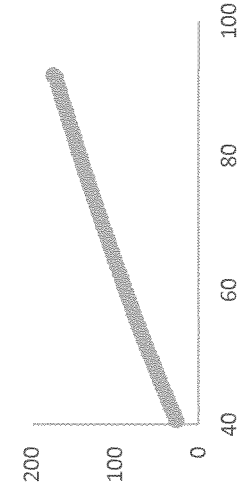
Fig. 2A
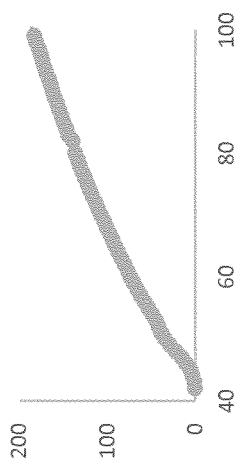
Fig. 2B
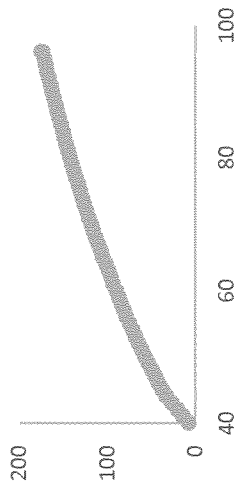
Fig. 2C
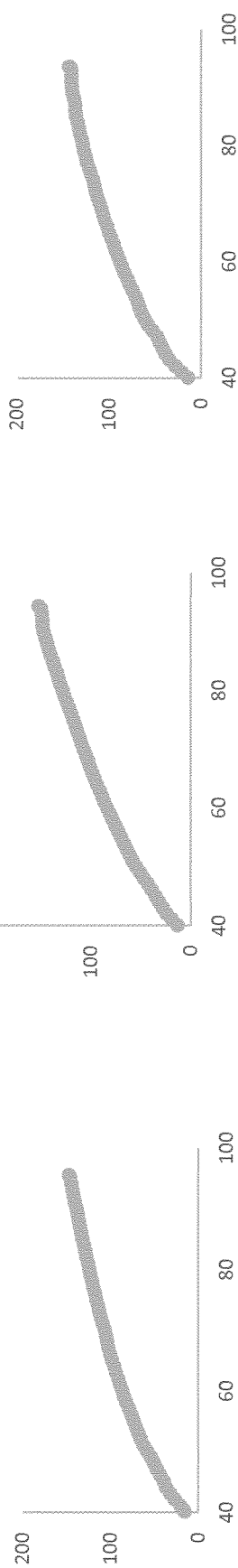
Fig. 2D
Fig. 2E
Fig. 2F

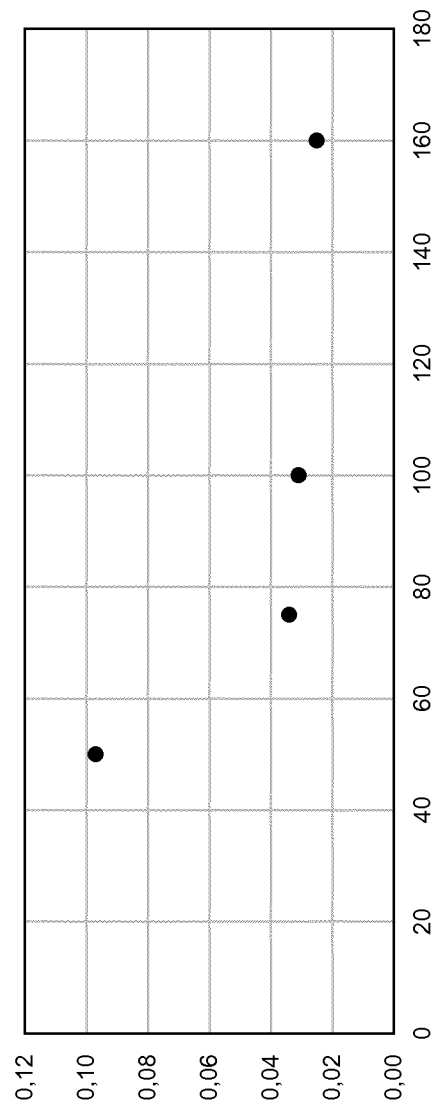

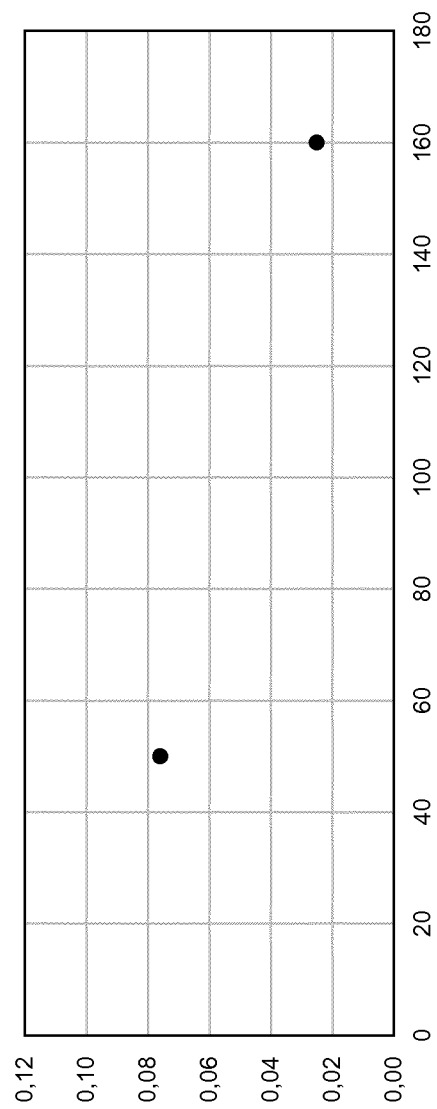

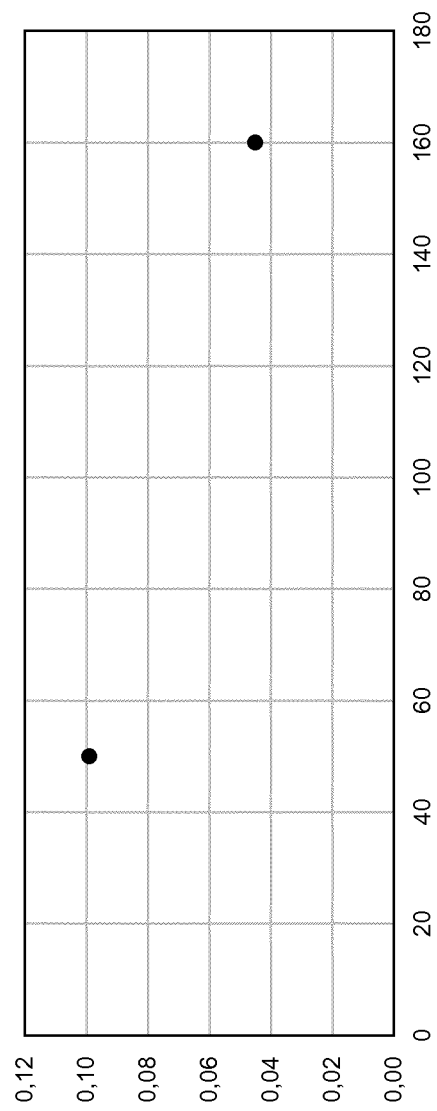

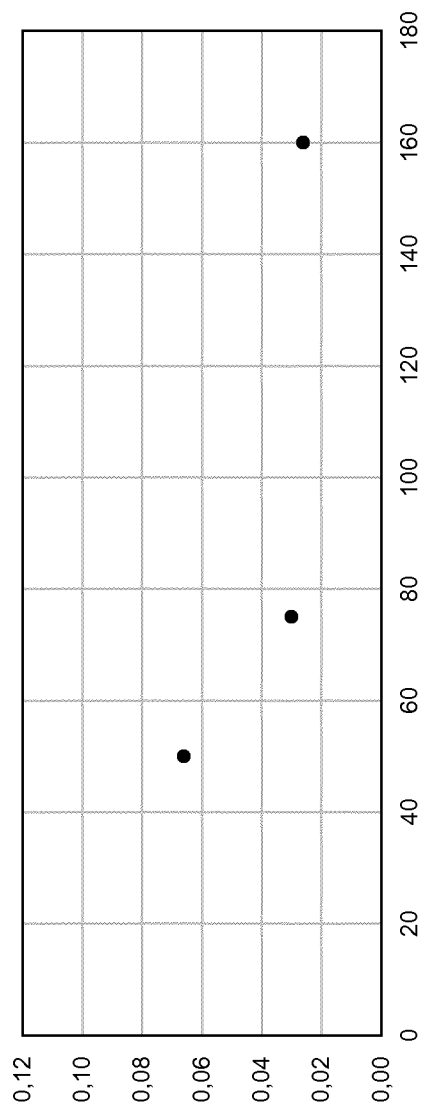

though before the present invention any such disclosure is not to be construed as an admission that the inventors are not entitled to antedate such material by virtue of prior invention.

PROCESS OF MAKING POLYOLEFINS

CROSS REFERENCE TO RELATED APPLICATIONS

This application is a National Stage application of PCT/EP2018/056408, filed Mar. 14, 2018, which claims the benefit of European Application No. 17191276.9, filed Sep. 15, 2017 and European Application No. 17161664.2, filed Mar. 17, 2017, all of which are incorporated by reference in their entirety herein.

BACKGROUND

The invention is related to a process of making polyolefins in a horizontal stirred bed polymerization reactor by contacting at least one olefin with a catalyst system while stirring, and to polyolefins obtainable by said process. Furthermore, the invention is directed to a catalyst system for polymerization of olefins in a polymerization reactor while stirring, comprising a procatalyst, a co-catalyst and optionally an external electron donor. Moreover, the present invention relates to polymers obtained by polymerization using said process and to the shaped articles of said polymers.

Catalyst systems and their components that are suitable for preparing a polyolefin such as polypropylene are generally known. One type of such catalysts is generally referred to as Ziegler-Natta catalysts. The term "Ziegler-Natta" is known in the art and it typically refers to catalyst systems comprising an organometallic compound (also typically referred to as a co-catalyst); optionally one or more electron donor compounds (e.g. external electron donors); and a transition metal-containing solid catalyst compound (also typically referred to as a procatalyst), comprising a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.-Sci. Eng. 41, vol. 3 and 4, 389-438, 1999. The preparation of such a procatalyst is for example disclosed in WO98/32427 A1.

The present inventors have observed that when these ZN catalyst are introduced into a continuous horizontal stirred bed reactor over time this leads to significantly higher power uptake of the stirrer in the reactor. There is a power uptake increase of stirrer in the reactor during the process of producing a polyolefin, induced by the use of different Ziegler-Natta catalysts. Without wishing to be bound by theory, the inventors believe that this is caused by higher amounts of electrostatic interactions between homopolymer powder produced using a procatalyst, causing the impeller to need more power (increased torque) to stir the reactor bed.

The present invention is aimed at providing an improved catalyst system for use in continuous horizontal stirred bed reactors. The present invention aims to decrease the increased power consumption over time for continuous horizontal stirred bed reactors. It is an object of the invention to provide a process for continuous production of a polyolefin in a polymerization reactor by contacting one or more olefins, preferably propylene, with a catalyst system while stirring. It is a further object of the invention to provide a catalyst system that provides a polyolefin having good polymer properties.

The inventors surprisingly found that by increasing the ratio of aluminum (Al) from the co-catalyst to titanium (Ti) from the procatalyst a significantly reduced power uptake of the stirrer. Additionally, the use of other antistatic agents in the homopolymer phase can also (further) reduce the power uptake of the stirrer.

SUMMARY

The present invention relates to a process for the continuous production of a polyolefin, preferably polypropylene, in a horizontal stirred bed polymerization reactor by contacting one or more olefins, preferably propylene, with a catalyst system while stirring, said catalyst system comprising: * a procatalyst comprising i) titanium; ii) a magnesium-containing support, preferably a magnesium chloride-containing support, and iii) an internal electron donor; * optionally an external electron donor; and * a co-catalyst, being a alkyl aluminum catalyst having formula $AlX_nR_{3-n}$, wherein each X is independently a halide or a hydride and wherein n is 0, 1 or 2, preferably 0, and wherein R is an C1-C12 alkyl group, preferably ethyl, wherein the molar ratio of aluminum (Al) from the co-catalyst to titanium (Ti) from the procatalyst (Al/Ti) is at least 75, preferably at least 100, more preferably at least 125, such as at least 150.

In an embodiment, an external electron donor is present, said external electron donor being a silane-based external electron donor. In an embodiment, the external electron donor is selected from DEATES or DiBDMS. In an embodiment, said procatalyst comprises as an internal donor a monocarboxylic acid ester, a dicarboxylic acid esters an aminobenzoates, a diether, a silyl ester, a succinate and/or combinations thereof. In an embodiment, said procatalyst comprises as an activator a monoester or a benzamide, preferably ethyl benzoate or N,N-diemethyl benzamide. In an embodiment, in the process to prepare said procatalyst in step i) a Grignard compound is used wherein $R^4$ is butyl or phenyl, preferably butyl. In an embodiment, the torque per 100 gram of polyolefin formed (dT) is at most 0.05, preferably at most 0.04, most preferably at most 0.03 nM per 100 gram of polyolefin formed. In an embodiment, as co-catalyst triethyl aluminum (TEAL) is used. In an embodiment, as a procatalyst a procatalyst is used comprising in wt. % based on the total weight of the procatalyst: magnesium: from 13 to 24, preferably from 14 to 22; titanium: from 1 to 5, preferably from 1.5 to 4.

The present invention also relates to the use of catalyst system comprising: * a procatalyst comprising i) titanium; ii) a magnesium-containing support, preferably a magnesium chloride-containing support, and iii) an internal electron donor; * optionally an external electron donor; and * a co-catalyst, being a alkyl aluminum catalyst having formula $AlX_nR_{3-n}$, wherein each X is independently a halide or a hydride and wherein n is 0, 1 or 2, preferably 0, and wherein R is an C1-C12 alkyl group, preferably ethyl, wherein the molar ratio of aluminum from the co-catalyst to titanium from the procatalyst is at least 75; in the production of a polyolefin, preferably polypropylene, in a horizontal stirred bed reactor for limiting the increase in the torque of the stirrer, and consequently lowering the power consumption of the stirrer engine. In an embodiment of use of the catalyst system, the molar ratio of aluminum from the co-catalyst to titanium from the procatalyst is at least 100, more preferably at least 125, such as at least 150.

The present invention also relates to a polyolefin, preferably a polypropylene, directly obtained by the process according to the invention and to a shaped article comprising the polyolefin, preferably polypropylene.

DRAWINGS

FIG. 1 shows six graphs depicting the torque (N·m) as a function of the time of polymerization (minutes);

FIG. 2 shows six graphs depicting the amount of polymer formed (grams) as a function of the time of polymerization (minutes);

FIGS. 3-6 show a graph depicting the delta Torque (Torque per 100 grams of polymer formed) as a function of the Al/Ti ratio.

DEFINITIONS

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises a Ziegler-Natta catalytic species supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen and/or nitrogen.

"external donor" or "external electron donor" or "ED" as used in the present description means: an electron-donating compound used as a reactant in the polymerisation of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—).

"Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si. Thus a heteroatom also includes halides.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. An alkyl group also encloses aralkyl groups wherein one or more hydrogen atoms of the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"alkoxide" or "alkoxy" as used in the present description means: a functional group or side-chain obtained from an alkyl alcohol. It consists of an alkyl bonded to a negatively charged oxygen atom.

"aryloxide" or "aryloxy" or "phenoxide" as used in the present description means: a functional group or side-chain obtained from an aryl alcohol. It consists of an aryl bonded to a negatively charged oxygen atom.

"Grignard reagent" or "Grignard compound" as used in the present description means: a compound or a mixture of compounds of formula R4zMgX42-z (R4, z, and X4 are as defined below) or it may be a complex having more Mg clusters, e.g. R4Mg3Cl2.

"polymer" as used in the present description means: a chemical compound comprising repeating structural units, wherein the structural units are monomers.

"olefin" as used in the present description means: an alkene.

"polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"XS" or "xylene soluble fraction" as used in the present description means: the weight percentage (wt. %) of soluble xylene in the isolated polymer, measured according to ASTM D 5492-10.

"polymerization conditions" as used in the present description means: temperature and pressure parameters within a polymerization reactor suitable for promoting polymerization between the catalyst composition and an olefin to form the desired polymer. These conditions depend on the type of polymerization used.

"yield" as used in the present description means: the amount of kilograms of polymer produced per gram of procatalyst consumed in the polymerization reactor per hour, unless stated otherwise.

"MFI" or "Melt Flow Index" as used in the present description is measured at a temperature of 230° C. with 2.16 kg load and measured according to ISO 1133:2005.

"bulk density" as used in the present description means: the weight per unit volume of a material, including voids inherent in the material as tested. Bulk density is measured as apparent density according to ASTM D1895-96 Reapproved 2010-e1, test method A.

"torque" as used in the present description means: a measure of the turning force of the (helical) stirrer inside the reactor that is required to maintain the same frequency, or revolutions per minute (RPM) of that stirrer.

"dT" or "delta Torque" as used in the present description means:

$$dT = \frac{(T_{end} - T_{start})}{Weight_{pp}}$$

wherein $T_{end}$ is the torque value as measured at the end of the one hour polymerization experiment; $T_{start}$ is the torque value as measured in the empty reactor; and $Weight_{pp}$ is the weight of polymer powder produced. The resulting delta torque value is therefore expressed in Nm per 100 grams of polymer formed. The torque value as measured in the empty reactor is the same in each experiment. Therefore, the difference in delta Torque in each experiment is a measure for the power that is needed to mix the total amount of polymer formed inside the reactor. An increase in delta torque in one experiment over another, therefore indicates that a higher turning force is needed for stirring the same amount of polymer resulting from that experiment.

A pulse sensor from IFM Electronic was added to the reactor stirrer axis to measure the RPM of the stirrer. The torque is measured using an Omron sysdrive frequency inverter, Type 3G3FV-R4004-CE, which feeds the electrical engine of the stirrer. The stirrer inside the reactor rotates using a magnetic coupling between the electrical engine and the stirrer. "lump content" as used in the present description means: the weight percentage of the total isolated polymer weight which does not pass through a sieve with pores smaller than 2.8 mm.

"H2/C3": as used in the present description means: the molar ratio of hydrogen to propylene in the gas cap of the reactor, measured by on-line gas chromatography. The present invention is described below in more detail. All embodiments described with respect to one aspect of the present invention are also applicable to the other aspects of the invention, unless otherwise stated.

DETAILED DESCRIPTION

Without wishing to be bound by any particular theory, the present inventors have found that in horizontal stirred bed reactors there might be large torque asserted on the stirring paddles/impellers. This is observed after these reactors have been operated for some time in continuous fashion. The inventors assume that this is due to buildup of polymer on the reactor walls—creasing statics. In order to test this assumption, the inventors have carried out laboratory tests (shown in the Examples) wherein the torque is measured over the duration of a polymerization experiment; they have observed that the torque increases with increasing polymer yield (as clearly visible from FIGS. 1a-1f).

In an embodiment the delta torque is at most 0.05, preferably at most 0.04, most preferably at most 0.03 nM per 100 gram of polyolefin formed. When—in a comparative example 3—heptane is added to the reactor on laboratory scale under pressure the torque temporarily decreases only to increase again.

The inventors assume (without wishing to be bound to a theory) that this is due to a "cleaning" effect of the heptane that removes polymer that is accumulated onto the stirring paddles/impellers and inside of reactors thereby reducing the torque. After some time the torque buildup starts again and increases to the initial level, since the static charge is not removed. When—in a comparative example 2—an antistatic agent is added to the reactor the torque decreases permanently. The inventors assume (without wishing to be bound to a theory) that this is due to an antistatic effect to counter the static buildup of polymer on the stirring paddles/impellers by electrostatic interaction. The addition of antistatic agents is—for some specific applications—not desired, e.g. for medical or food grade applications where additional compounds in the final polymer are to be prevented for safety reasons. Moreover, the use of an antistatic agent may be costly. The present invention helps to solve this issue of statics by an inventive and special selection of the ratio of Al over Ti.

Details of the Horizontal Stirred Bed Reactor

The present method is carried out in a horizontal stirred bed reactor. As a non-limiting example of such a type of reactor, the reactor is mentioned that is disclosed in U.S. Pat. No. 4,101,289; the information in this application relating to the reactor is incorporated by reference. A horizontal, stirred reactor may be used that is of substantially circular cross section containing a centrally-located drive shaft extending longitudinally through said reactor. To said drive shaft may be attached a plurality of adjacently located paddles, which paddles cause essentially no forward or backward movement of the particulate matter contained in said reactor and extend transversely within and to a short distance from the internal surfaces of said reactor. Said reactor may be divided into two or more individually polymerization-temperature controllable polymerization sections by one or more barriers constructed to allow free gas mixing within said reactor and control particulate movement between said sections.

Details of the Procatalyst

The procatalyst in the catalyst system according to the present invention is a typical procatalyst of a Ziegler-Natta type of catalyst as known in the art, which typically comprises a transition metal-containing solid catalyst compound; an organo-metal compound (co-catalyst) and optionally one or more electron donor compounds (external donors).

The transition metal-containing solid catalyst compound typically comprises a transition metal halide, i.e. titanium, chromium, vanadium halide that may be supported on a metal or metalloid compound, such as magnesium chloride or silica. Such procatalysts are already described in the prior art, for instance in documents WO96/32426A, WO2006/056338A1, EP1838741B1 and U.S. Pat. No. 5,077,357. Any Ziegler-Natta type support and any transition metal halide compounds known in the art can be used in the procatalyst of the catalyst composition according to the present invention. For instance, titanium-magnesium based procatalyst compositions with different magnesium-containing support-precursors, such as magnesium halides, magnesium alkyls and magnesium aryls, and also magnesium alkoxy and magnesium aryloxy compounds for polyolefin production, particularly of polypropylenes production are described in U.S. Pat. No. 4,978,648, WO96/32427A1, WO01/23441 A1, EP1283 222A1, EP1222214B1; U.S. Pat. Nos. 5,077,357; 5,556,820; 4,414,132; 5,106,806 and 5,077,357 but the present composition is not limited to the disclosure in these documents.

The procatalyst may include a magnesium moiety. Suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. The magnesium moiety may be a magnesium dialkoxide, such as diethoxymagnesium. The procatalyst include a titanium moiety as (part of) the catalytic active species. Suitable titanium moieties include titanium alkoxides, titanium aryloxides, titanium alkoxy halides, and titanium halides. The procatalyst may comprise (i) magnesium; (ii) a titanium compound; (iii) a halide, a carboxylate, an oxyhalide, and/or an alkoxide of (i) and/or (ii); (iv) an internal electron donor; and (v) combinations of (i), (ii), (iii), and (iv). Suitable procatalyst include halides, oxyhalides, and alkoxides of titanium. The procatalyst in the catalyst system according to the present invention may preferably comprise magnesium, titanium, a halogen and an internal electron donor.

In an embodiment the procatalyst is prepared using a method according to EP 1 273 595 of Borealis Technology; viz. by a process for producing an olefin polymerization procatalyst in the form of particles having a predetermined size range, said process comprising: preparing a solution a complex of a Gp IIa metal and an electron donor by reacting a compound of said metal with said electron donor or a precursor thereof in an organic liquid reaction medium; reacting said complex, in solution, with at least one compound of a transition metal to produce an emulsion the dispersed phase of which contains more than 50 mol % of the Gp IIa metal in said complex; maintaining the particles of said dispersed phase within the average size range 10 to 200 mu m by agitation in the presence of an emulsion stabilizer and solidifying said particles; and recovering, washing and drying said particles to obtain said procatalyst.

In an embodiment the procatalyst is prepared using a method according to EP 0 019 330 of Dow; viz. an olefin polymerization catalyst composition comprising: a) a reaction product of an organo aluminum compound and an electron donor, and b) a solid component which has been obtained by halogenating a magnesium compound with the formula $MgR^1R^2$ wherein $R^1$ is an alkyl, aryl, alkoxide or aryloxide group and $R^2$ is an alkyl, aryl, alkoxide or aryloxide group or halogen, with a halide of tetravalent titanium in the presence of a halohydrocarbon, and contacting the halogenated product with a tetravalent titanium compound.

The procatalyst may be produced by any method known in the art using the present internal electron donor according for Formula A. The procatalyst may for example be produced as disclosed in WO96/32426A; this document discloses a process for the polymerization of propylene using a catalyst comprising a procatalyst obtained by a process wherein a compound with formula $Mg(OAlk)xCly$ wherein x is larger than 0 and smaller than 2, y equals 2−x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor, which is di-n-butyl phthalate.

Preferably, the Ziegler-Natta type procatalyst in the catalyst system according to the present invention is obtained by the process that is similar to the process as described in EP2027164B1. Example I including all sub-examples (IA-IE) is incorporated into the present description. More details about the different embodiments are disclosed starting in paragraphs [0016] tot [0089]. All these embodiments related to the process and products are incorporated by reference into the present description. In the following part of the description the different steps and phases of the process for preparing the procatalyst according to the present invention will be discussed.

The process for preparing a procatalyst according to the present invention comprises the following phases: phase A): preparing a solid support for the procatalyst; phase B): optionally activating said solid support obtained in phase A using one or more activating compounds to obtain an activated solid support; phase C): contacting said solid support obtained in phase A or said activated solid support in phase B with a catalytic species wherein phase C may comprise one of the following: contacting said solid support obtained in phase A or said activated solid support in phase B with a catalytic species and one or more internal donors to obtain said procatalyst; or contacting said solid support obtained in phase A or said activated solid support in phase B with a catalytic species and one or more internal donors to obtain an intermediate product; or contacting said solid support obtained in phase A or said activated solid support in phase B with a catalytic species and an activator to obtain an intermediate product; and optionally Phase D): modifying said intermediate product obtained in phase C wherein phase D may comprise one of the following: modifying said intermediate product obtained in phase C with a Group 13- or transition metal modifier in case an internal donor was used during phase C, in order to obtain a procatalyst; modifying said intermediate product obtained in phase C with a Group 13- or transition metal modifier and an internal donor in case an activator was used during phase C, in order to obtain a procatalyst.

The procatalyst thus prepared can be used in polymerization of olefins using an external donor and a co-catalyst. The various steps used to prepare the catalyst according to the present invention are described in more detail below. The catalyst according to the present invention thus prepared can be used in polymerization of olefins using an external donor and a co-catalyst.

Phase A: Preparing a Solid Support for the Catalyst.

In the process of the present invention preferably a magnesium-containing support is used. Said magnesium-containing support is known in the art as a typical component of a Ziegler-Natta procatalyst. This step of preparing a solid support for the catalyst is the same as in the prior art process. The following description explains the process of preparing magnesium-based support. Other supports may be used. Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283222A1, EP1222214B1; U.S. Pat. Nos. 5,077,357; 5,556,820; 4,414,132; 5,106,806 and 5,077,357 but the present process is not limited to the disclosure in these documents.

Preferably, the process for preparing the solid support for the procatalyst according to the present invention comprises the following steps: step o) which is optional and step i). Step o) preparation of the Grignard reagent (optional) and Step i) reacting a Grignard compound with a silane compound. Optional step o), including many embodiments, is described in detail in WO2015091984 A1 of the same applicant, page 15 line 14 to page 16, line 28, which complete section is incorporated here by reference. Step i), including many embodiments, is described in detail in WO2015091984 A1, page 16 line 30 to page 22, line 25, which complete section is incorporated here by reference.

Phase B: Activating Said Solid Support for the Catalyst.

This step of activating said solid support for the catalyst is an optional step that is not required, but is preferred, in the present invention. If this step of activation is carried out, preferably, the process for activating said solid support comprises the following step ii). This phase may comprise one or more stages. Step ii) relates to the activation of the solid magnesium compound and this step, including many embodiments, is described in detail in WO2015091984 A1 of the same applicant, page 23 line 3 to page 28, line 14, which complete section is incorporated here by reference. According to the present invention, the solid support and procatalyst preferably have an average particle size (or APS) of between 24-30 microns. The particle size is measured using a test method based on ASTM standard test method D4464-201.

Phase C: Contacting Said Solid Support with the Catalytic Species and Either One or More Internal Donors or an Activator.

Phase C: contacting the solid support with a catalytic species. This step can take different forms, such as i) contacting said solid support with the catalytic species and one or more internal donors to obtain said procatalyst; ii) contacting said solid support with a catalytic species and one or more internal donors to obtain an intermediate product; iii) contacting said solid support with a catalytic species and an activator to obtain an intermediate product. This phase C, is described in detail in WO2015091984 A1 of the same applicant, page 28 line 15 to page 31, line 13, which complete section is incorporated here by reference. Preferably, the process of contacting said solid support with the catalytic species and an internal donor comprises the following step iii).

Step iii) reacting the solid support with a transition metal halide (e.g. titanium, chromium, hafnium, zirconium, vanadium) but preferably titanium halide. In the discussion below only the process for a titanium-base Ziegler-Natta procatalyst is disclosed, however, the application is also applicable to other types of Ziegler-Natta procatalysts. Step iii) is described in detail in WO2015091984 A1 page 29 line 28 to page 31, line 13, which complete section is incorporated here by reference. An internal electron donor is added during step iii) according to Formula A. Also mixtures of internal electron donors can be used. Examples of internal electron donors that may be used in addition to the internal electron donor according for Formula A are disclosed below. In an embodiment, only an internal electron donor according to Formula A is used. The molar ratio of the internal electron donor(s) relative to the magnesium may vary between wide limits, for instance from 0.01 to 0.75. Preferably, this molar ratio is from 0.02 to 0.4; more preferably from 0.03 to 0.2. Other optional ranges are between 0.04 to 0.08; between 0.1 and 0.4 or between 0.1 and 0.3. Optionally an activator is present during step iii) of Phase C instead of an internal donor, this is explained in more detail below in the section of activators. The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5.

Phase D: Modifying Said Intermediate Product with a Metal-Based Modifier.

This phase D is optional in the present invention. In a preferred process for modifying the supported catalyst, this phase consists of the following steps: Step iv) modifying the third intermediate product with a metal-modifier to yield a modified intermediate product; Step v) contacting said modified intermediate product with a titanium halide and optionally on or more internal donors to obtain the present procatalyst. The order of addition, viz. the order of first step iv) and subsequently step v) is considered to be very important to the formation of the correct clusters of Group 13- or transition metal and titanium forming the modified and more active catalytic center. Each of these steps is disclosed in more detail below. It should be noted that the steps iii), iv) and v) (viz. phases C and D) are preferably carried out in the same reactor, viz. in the same reaction mixture, directly following each other. Preferably step iv) is carried out directly after step iii) in the same reactor. Preferably, step v) is carried out directly after step iv) in the same reactor. This step iv) is described in detail in WO2015091984 A1 of the same applicant, page 32 line 31 to page 35, line 11, which complete section is incorporated here by reference. This step iv) is described in detail in WO2015091984 A1 of the same applicant, page 35 line 14 to page 37, line 14, which complete section is incorporated here by reference.

More information regarding e.g. the ratios of reaction products, weight ratio of certain components in the solid procatalyst and details regarding the procatalyst and its components are as described in WO2015091984 A1 of the same applicant (page 40 line 25 to page 41 line 23), which complete section is incorporated here by reference.

In an embodiment the procatalyst is prepared using a method comprises the steps of:

i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl; $X^4$ and $X^1$ are each independently selected from the group consisting of fluoride ($F^-$), chloride ($Cl^-$), bromide ($Br^-$) or iodide ($I^-$), preferably chloride; z is in a range of larger than 0 and smaller than 2, e.g. z=1, being 0<z<2; x is in a range of larger than 0 and smaller than 2, being 0<x<2, e.g. x=1;

ii) optionally contacting the first intermediate reaction product obtained in step i) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; $M^2$ is a metal being Si; v is the valency of $M^1$ or $M^2$ respectively; w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; for example v being either 3 or 4; and iii) contacting the first or second intermediate reaction product, obtained respectively in step i) or ii), with a halogen-containing Ti-compound, optionally an activator, and an internal electron donor.

In other words, a process which comprises the steps of: i) contacting a compound $R^4_z MgX^4_{2-z}$ wherein $R^4$ is aromatic, aliphatic or cyclo-aliphatic group containing 1 to 20 carbon atoms, preferably butyl or phenyl, $X^4$ is a halide, and z is in a range of larger than 0 and smaller than 2, preferably 1; with an alkoxy- or aryloxy-containing silane, preferably tetraalkoxy silane (e.g. tetraethoxy silane) to give a first intermediate reaction product; ii) contacting the solid $Mg(OR^1)_x X_{2-x}$ with at least one, preferably two, activating compound selected from the group formed by electron donors and compounds of formula $M^1(OR^2)_{v-w}(OR^3)_w$, wherein M is Ti, Zr, Hf, Al or Si and $M^2(OR^2)_{v-w}(R^3)_w$, wherein $M^2$ is Si, each $R^2$ and $R^3$, independently, represent an alkyl, alkenyl or aryl group, v is the valency of M (either $M^1$ or $M^2$), v being either 3 or 4 and w is smaller than v; and iii) contacting the second intermediate reaction product with a halogen-containing Ti-compound, an internal electron donor represented by formula A, wherein the R group is either a hydrogen atom (H) or a methyl group (—CH$_3$); N is a nitrogen atom; and O is an oxygen atom; preferably wherein the first intermediate reaction product is contacted with an alcohol (e.g. ethanol) and a titanium tetraalkoxide (e.g. titanium tetraethoxide) in step ii).

In an embodiment, said alkoxy- or aryloxy-containing silane being $Si(OR^5)_{4-n}(R^6)_n$ wherein: $R^5$ and $R^6$ are each independently selected from linear, branched or cyclic hydrocarbyl group independently selected from alkyl, alkenyl, aryl, aralkyl, alkoxycarbonyl or alkylaryl groups (preferably alkyl groups), and one or more combinations thereof; wherein said hydrocarbyl group may be substituted or unsubstituted, may contain one or more heteroatoms and preferably has from 1 to 20 carbon atoms; more preferably C1 to C4 alkyl; and n is in range of 0 to 4, preferably n is from 0 up to and including 1. In a more preferred embodiment said alkoxy- or aryloxy-containing silane being $Si(OR^5)_4$ wherein $R^5$ is C1 to C4 alkyl, most preferably all $R^5$ are ethyl, being tetraethoxy silane (TES).

In a further embodiment, an activator is used, preferably in step iii). In a further embodiment, said activator is selected from the group consisting of benzamides, alkylbenzoates, and mono-esters. In a further embodiment, said activator is selected from the group consisting of ethyl acetate, amyl acetate, butyl acetate, ethyl acrylate, methyl methacrylate, and isobutyl methacrylate, benzamide, methylbenzamide, dimethylbenzamide, methylbenzoate, ethylbenzoate, n-propylbenzoate, iso-propylbenzoate, n-butylbenzoate, 2-butylbenzoate, and t-butylbenzoate. In a preferred embodiment, ethyl acetate or ethyl benzoate is used as activator.

In another aspect a butyl Grignard (preferably BuMgCl or n-BuMgCl) is used to prepare the procatalyst composition. In another aspect a phenyl Grignard (preferably PhMgCl) is used to prepare the procatalyst composition. In an embodiment, the procatalyst has been modified by using a group 13- or transition metal modifier. This embodiment is applicable to all specific embodiments discussed above. In an embodiment, TiCl$_4$ is used in step iii) as the catalytic species. This embodiment is applicable to all specific embodiments discussed above. In a further embodiment, during step ii) as activating compounds an alcohol is used as activating electron donor and titanium tetraalkoxide is used as metal alkoxide compound. More preferably a combination of ethanol and titanium tetraethoxide (TET). This embodiment is applicable to all specific embodiments discussed above.

The procatalyst may have a titanium content of from about 0.1 wt. % to about 6.0 wt. %, based on the total solids weight, or from about 1.0 wt. % to about 4.5 wt. %, or from about 1.5 wt. % to about 3.5 wt. %. The weight ratio of titanium to magnesium in the solid procatalyst composition may be between about 1:3 and about 1:160, or between about 1:4 and about 1:50, or between about 1:6 and about 1:30. Weight percent is based on the total weight of the procatalyst composition. The magnesium to internal electron donor molar ratio may be from about 100:1 to about 1:1, or from about 30:1 to about 2:1, or from about 15:1 to about 3:1. As used herein, an "internal electron donor" or an "internal donor" is a compound added during formation of the procatalyst composition that donates a pair of electrons to one or more metals present in the resultant procatalyst composition. Not bounded by any particular theory, it is believed that the internal electron donor assists in regulating the formation of active sites thereby enhancing catalyst stereoselectivity. The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters), aminobenzoates, diethers, silyl esters succinates and/or combinations thereof.

A monocarboxylic acid may be used as internal electron donor. As used herein, an "aromatic acid ester" is a monocarboxylic acid ester (also called "benzoic acid ester") as shown in Formula V below

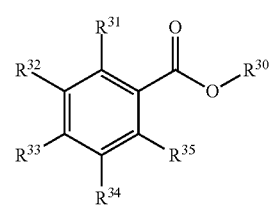

(Formula V)

This internal donor and the R-groups are described in detail in WO201502298 A1 of the same applicant, page 36 line 5 to page 37, line 7, which complete section is incorporated here by reference.

A dicarboxylic acid ester (e.g. an o-dicarboxylic acid also called "phthalic acid ester") as shown in Formula VI or a poly carboxylic acid ester may be used as internal electron donors.

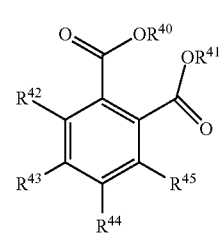

(Formula VI)

This internal donor and the R-groups are described in detail in WO2015091984 A1 of the same applicant, page 4 line 7 to page 5, line 4, and page 44, line 4-page 45, line 10 which complete sections are incorporated here by reference.

In an embodiment, said internal donor is a substituted 1,2-phenylene aromatic diester compound according to Formula A

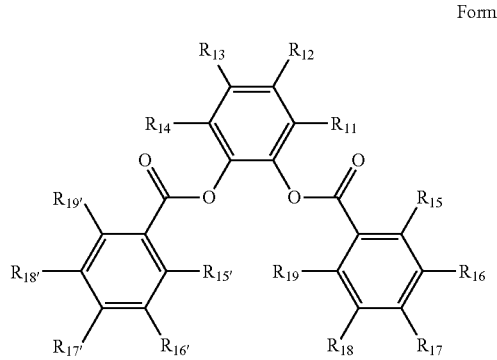

Formula A wherein $R_{11}$, $R_{12}$, $R_{13}$, $R_{14}$, $R_{15}$, $R_{15'}$, $R_{16}$, $R_{16'}$, $R_{17}$, $R_{17'}$, $R_{18}$, $R_{18'}$, $R_{19}$, and $R_{19'}$ are the same or different and wherein each of these R-groups is independently selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof and on the proviso that not all of R-groups may be hydrogen. Preferably, wherein the compound of Formula A is 3-methyl-5-tert-butyl-1,2-phenylene dibenzoate represented by Preferably, wherein the compound of Formula A is 3-methyl-5-tert-butyl-1,2-phenylene dibenzoate represented by

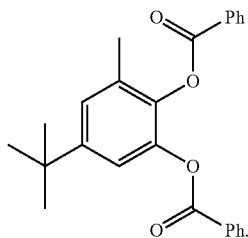 [SMILES: Cc1cc(C(C)(C)C)cc(OC(=O)c2ccccc2)c1OC(=O)c1ccccc1]

The internal donor may also be an aminobenzoate according to formula XI

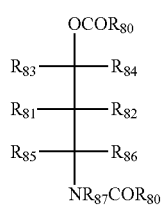

Formula XI

This internal donor and the R-groups are described in detail in WO2015091984 A1 of the same applicant, page 4 line 7 to page 5, line 4, and page 45, line 14 to page 48, line 15 which complete sections are incorporated here by reference.

A di-ether may be used as internal electron donor. As used herein a "di-ether" may be a 1,3-hydrocarboxypropane compound, optionally substituted on the 2-position represented by the Formula VII, A di-ether may be used as internal electron donor. As used herein a "di-ether" may be a 1,3-hydrocarboxypropane compound, optionally substituted on the 2-position represented by the Formula VII,

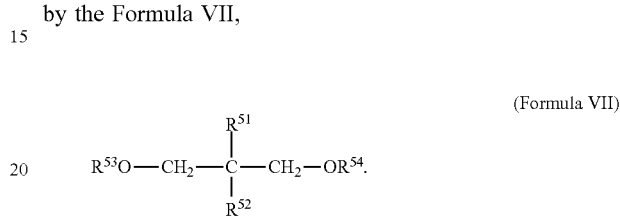

(Formula VII)

This internal donor and the R-groups are described in detail in WO2015022298 A1 of the same applicant, page 38 line 8 to page 40, line 4, which complete section is incorporated here by reference. A list of specific examples thereof is disclosed on WO2015022298 A1, page 38 line 30 to page 39, line 31, which section is incorporated here by reference. In a further embodiment of the first aspect, the internal donor is 9,9-bis(methoxymethyl)fluorene (also denoted as Flu).

The silyl ester as internal donor can be any silyl ester known in the art, for instance as disclosed in U.S. 61/117,820. The succinates that may be used as internal electron donors are the following. As used herein a "succinate acid ester" is a 1,2-dicarboxyethane.

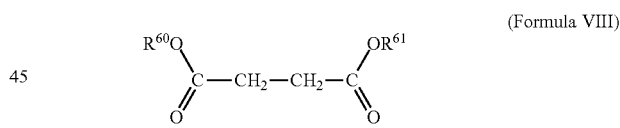

(Formula VIII)

This internal donor and the R-groups are described in detail in WO2015022298 A1 of the same applicant, page 40 line 7 to page 41, line 12, which complete section is incorporated here by reference.

Detailed Description of Activator

In an embodiment, an activator is present during this phase C; it may be added during any of the several stages (e.g. I, II and III). iii). The activator may be added during the same or a different stage as the internal electron donor. Several activators can be used, such as benzamide, alkylbenzoates, and monoesters. Each of these will be discussed below.

A benzamide activator has a structure according to Formula X as disclosed in WO2015091983 A1 of the same applicant, page 13, line 13-page 14, line 37, which complete section is incorporated here by reference. The R-groups are disclosed in detail in said reference.

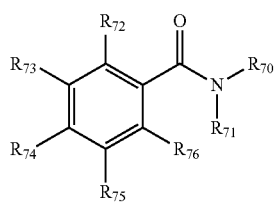

Formula X

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added. A detailed description of regarding the use of alkylbenzoates as activators is to be found in WO2015091984 A1 of the same applicant, page 42 lines 1-12, which section is incorporated here by reference. More preferably, the activator is ethylbenzoate. A detailed description of regarding the use of mono-esters as activators is to be found in WO2015091984 A1 of the same applicant, page 42 line 12-page 43, line 24, which section is incorporated here by reference.

Detailed Description of Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", as described in WO2015091984 A1 of the same applicant, page 59 line 1 to page 60 line 30, which is incorporated here by reference.

The co-catalyst may include any compounds known in the art to be used as "co-catalysts", such as hydrides, alkyls, or aryls of aluminum. The co-catalyst may be a hydrocarbyl aluminum co-catalyst represented by the formula $R^{20}{}_3Al$, wherein each $R^{20}$ may be independently selected from a hydrogen or a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. On the proviso that at least one $R^{20}$ is a hydrocarbyl group. Optionally, two or three $R^{20}$ groups are joined in a cyclic radical forming a heterocyclic structure. Examples of $R^{20}$ are methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, methylnapthyl, cyclohexyl, cycloheptyl, and cyclooctyl.

Suitable examples of hydrocarbyl aluminum compounds as co-catalyst include triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride.

The co-catalyst can also be a hydrocarbyl aluminum compound represented by the formula $R^{21}{}_m AlX^{21}{}_{3-m}$ wherein m, $X^{21}$ and $R^{21}$ are as follows. $R^{21}$ is an alkyl group. Said alkyl group may be linear, branched or cyclic. Said alkyl group may be substituted or unsubstituted. Preferably, said alkyl group has between 1 and 20 carbon atoms, more preferably between 1-12 carbon atoms, even more preferably between 1 and 6 carbon atoms. Non-limiting examples of suitable $R^{21}$ groups are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl. $X^{21}$ is selected from the group of consisting of fluoride (F—), chloride (Cl—), bromide (Br—) or iodide (I—) or an alkoxide (RO⁻). And m is 1 or 2. Non-limiting examples of suitable alkyl aluminium halide compounds for co-catalyst include tetraethyl-dialuminoxane, methylaluminoxane, isobutylaluminoxane, tetraisobutyl-dialuminoxane, diethylaluminumethoxide, diisobutylaluminum chloride, methylaluminum dichloride, diethylaluminum chloride, ethylaluminum dichloride and dimethylaluminum chloride. Non-limiting examples of suitable compounds include tetraethyldialuminoxane, methylaluminoxane, isobutylaluminoxane, tetraisobutyldialuminoxane, diethylaluminum ethoxide, diisobutylaluminum chloride, methylaluminum dichloride, diethylaluminum chloride, ethylaluminum dichloride and dimethylaluminum chloride.

Preferably, the co-catalyst is triethylaluminum. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1.

Detailed Description of External Donor

One of the functions of an external donor compound is to affect the stereoselectivity of the catalyst system in polymerization of olefins having three or more carbon atoms. Therefore it may be also referred to as a selectivity control agent. Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes. The aluminum/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

Documents EP1538167 and EP1783145 disclose a Ziegler-Natta catalyst type comprising an organo-silicon compound as external donor that is represented by formula Si(ORc)3(NRdRe), wherein Rc is a hydrocarbon group having 1 to 6 carbon atoms, Rd is a hydrocarbon group having 1 to 12 carbon atoms or hydrogen atom, and Re is a hydrocarbon group having 1 to 12 carbon atoms used as an external electron donor. Examples of suitable external donors according to the present invention are known from WO2015091984 A1, being compounds according to Formula III, alkyl-alkoxysilanes according to Formula IV, organosilicon compounds having formula Si(ORa)4-nRbn, imidosilanes according to Formula I, alkylimidosilanes according to Formula I' as described on page 61 line 26 to page 67 line 8 which is incorporated here by reference. Alkoxy silane halide are used for preparing imidosilane and alkylimidosilane internal donors and are, respectively, according to Formula XXIVa: ZnSi(OR11)4-n and Formula XXIVa: ZnSi(OR11)4-n-m(R12)m. In the alkoxy silane halide represented by Formula XXIVa and XXIVb, Z is halogen group, and more preferably a chlorine group; n=1, 2 or 3. Specific examples regarding the external donor, considering Formula I' in WO2015091984 A1, are described in WO2015091984 A1 of the same applicant, page 67 lines 9-22, which is incorporated here by reference.

The additional compound(s) in the external donor according to the invention may be one or more alkoxysilanes, as described in WO2015091984 A1 of the same applicant, page 67 line 24 to page 69 line 4, which section is incorporated here by reference. In an embodiment, the silane-compound for the additional external donor is dicyclopentyl dimethoxysilane, di-isopropyl dimethoxysilane, di-isobutyl dimethoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

The aluminum/external donor molar ratio in the polymerization catalyst system preferably is between 0.1 and 200; more preferably between 1 and 100. The external donor of the present invention may include from about 0.1 mol % to about 99.9% mol % of the silane represented by Formula I and from about 99.9 mol % to about 0.1 mol % of the additional alkoxysilane. The Si/Ti molar ratio in the catalyst system can range from 0.1 to 40, preferably from 0.1 to 20, even more preferably from 1 to 20 and most preferably from 2 to 10.

The invention also relates to a polymerization catalyst system that comprises the procatalyst according to the invention and a co-catalyst. Preferably, the catalyst system also comprises an external electron-donating compound, also referred to as external electron donor, or simply external donor. The invention also relates to a process to make the catalyst system by contacting the several components. The procatalyst, the cocatalyst and optionally the external donor can be contacted in any way known to the skilled person in the art; and as also described herein. The invention further relates to a process for making a polyolefin by contacting an olefin with the catalyst system according to the present invention.

The external donor in the catalyst system according to the present invention can be complexed with the co-catalyst and mixed with the procatalyst composition (pre-mix) prior to contact between the catalyst composition and the olefin. The external donor can also be added independently to the polymerization reactor. The procatalyst composition, the cocatalyst, and the external donor can be mixed or otherwise combined prior to addition to the polymerization reactor. Contacting the olefin with the catalyst system according to the present invention can be done under standard polymerization conditions, known to the skilled person in the art.

The present catalyst system is suitable for use in a continuous gas-phase polymerization processes in a horizontal stirred bed reactor.

The olefin according to the invention may be selected from mono- and di-olefins containing from 2 to 20 carbon atoms. Suitable olefin monomers include alpha-olefins, such as ethylene, propylene, C4-C20 alpha-olefins, such as 1-butene, 1-pentene, 1-hexene, 4-methyl-1-pentene, 1-heptene, 1-octene, 1-decene, 1-dodecene and the like; C4-C20 diolefins, such as 1,3-butadiene, 1,3-pentadiene, norbornadiene, 5-vinyl-2-norbornene (VNB), 1,4-hexadiene, 5-ethylidene-2-norbornene (ENB) and dicyclopentadiene; C8-C40 vinyl aromatic compounds including styrene, o-, m- and p-methylstyrene, divinylbenzene, vinylbiphenyl, vinylnapthalene; and halogen-substituted C8-C40 vinyl aromatic compounds such as chlorostyrene and fluorostyrene.

Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butane, hexane, heptane, octene. A propylene copolymer is herein meant to include both so-called random copolymers which typically have relatively low comonomer content, e.g. up to 10 mol %, as well as so-called impact PP copolymers or heterophasic PP copolymers comprising higher comonomer contents, e.g. from 5 to 80 mol %, more typically from 10 to 60 mol %. The impact PP copolymers are actually blends of different propylene polymers; such copolymers can be made in one or two reactors and can be blends of a first component of low comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

The present invention also relates to a polyolefin, preferably a polypropylene obtained or obtainable by a process, comprising contacting an olefin, preferably propylene or a mixture of propylene and ethylene with the procatalyst according to the present invention. The terms polypropylene and propylene-based polymer are used herein interchangeable. The polypropylene may be a propylene homopolymer or a mixture of propylene and ethylene, such as a propylene-based copolymer, e.g. heterophasic propylene-olefin copolymer; random propylene-olefin copolymer, preferably the olefin in the propylene-based copolymers being ethylene. Such propylene-based (co)polymers are known to the skilled person in the art; they are also described herein above. The polyolefin, preferably the propylene-based polymer according to the present invention may further comprise additives. Such additives are well known in the art. The skilled person can readily select any suitable combination of additives and additive amounts without undue experimentation. The amount of additives depends on their type and function. The invention also relates to the use of the polyolefins, preferably the propylene-based polymers according to the invention in injection moulding, blow moulding, extrusion moulding, compression moulding, thin-walled injection moulding, etc, for example in food contact applications.

The present invention moreover relates to the use of a titanium to aluminum ratio during the Ziegler-Natta polymerization of olefins in a horizontal stirred bed reactor to reduce the energy (power) consumption in view of a situation wherein the titanium to aluminum ratio is lower.

Furthermore, the invention relates to a shaped article comprising the polyolefin, preferably the propylene-based polymer according to the present invention. The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

CLAUSES

1. A process for the continuous production of a polyolefin, preferably polypropylene, in polymerization reactor by contacting one or more olefins, preferably propylene, with a catalyst system while stirring, said catalyst system comprising:
   a procatalyst comprising i) titanium; ii) a magnesium-containing support, preferably a magnesium chloride-containing support, and iii) an internal electron donor;
   optionally an external electron donor; and
   a co-catalyst, being a alkyl aluminum catalyst having formula $AlX_nR_{3-n}$, wherein each X is independently a halide or a hydride and wherein n is 0, 1 or 2, preferably 0, and wherein R is an C1-C12 alkyl group, preferably ethyl,
   wherein the molar ratio of aluminum from the co-catalyst to titanium from the procatalyst is at least 75, preferably at least 100, more preferably at least 125, such as at least 150.

2. A process for the continuous production of a polyolefin, preferably polypropylene, in polymerization reactor by contacting one or more olefins, preferably propylene, with a catalyst system while stirring, said catalyst system comprising:
   a procatalyst comprising i) titanium; ii) a magnesium-containing support, preferably a magnesium chloride-containing support, and iii) an internal electron donor; which has been prepared by a process comprising the steps of
   i) contacting a compound $R^4_zMgX^4_{2-z}$ with an alkoxy- or aryloxy-containing silane compound to give a first intermediate reaction product, being a solid $Mg(OR^1)_xX^1_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl; $X^4$ and $X^1$ are each independently selected from the group consisting of fluoride (F$^-$), chloride (Cl$^-$), bromide (Br$^-$) or iodide (I$^-$), preferably chloride; z is in a range of larger than 0 and smaller than 2, e.g. z=1, being 0<z<2; x is in a range of larger than 0 and smaller than 2, being 0<x<2, e.g. x=1;

ii) optionally contacting the first intermediate reaction product obtained in step i) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; $M^2$ is a metal being Si; v is the valency of $M^1$ or $M^2$ respectively; w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; for example v being either 3 or 4; and iii) contacting the first or second intermediate reaction product, obtained respectively in step i) or ii), with a halogen-containing Ti-compound, optionally an activator, and an internal electron donor;

optionally an external electron donor; and
   a co-catalyst, being a alkyl aluminum catalyst having formula $AlX_nR_{3-n}$, wherein each X is independently a halide or a hydride and wherein n is 0, 1 or 2, preferably 0, and wherein R is an C1-C12 alkyl group, preferably ethyl,
   wherein the molar ratio of aluminum from the co-catalyst to titanium from the procatalyst is at least 75, preferably at least 100, more preferably at least 125, such as at least 150.

It is noted that the invention relates to all possible combinations of features recited in the claims. Features described in the description may further be combined. It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The invention will be further elucidated with the following examples without being limited hereto.

Examples 1-3 and Comparative Examples 1-3

A procatalyst is prepared according to the Experiment 3 in US2016/0311947A1 comprising BA-2Me as an activator and Flu as an internal donor.

Homopolymerization with fixed H2 concentrations were carried out using DEATES (DiEthyl Amino TriEthoxy Silane) as the external donor in an amount such that the molar ratio of Si from the DEATES to Ti from the procatalyst is 9 mol/mol. TEAL is used as co-catalyst in such an amount that the molar ratio of Al from TEAL to Ti of the procatalyst is as disclosed in the table below. For Comparative example 2 an antistatic agent (a mixture is used of n-heptane, n-dodecyl-benzenesulfonic acid and castor oil; e.g. commercially available as Statsafe™ 6633 with a total volume of 1 ml) is added in an amount of 50 ppm based on polymer produced and for comparative example 3 only 1 ml of heptane is added without an antistatic agent. The temperature during polymerization is 70° C., the propylene pressure is 20 bar, the H2 concentration is 1%.

Table 1 shows the effect of the aluminum/titanium ratio on the torque increase compared to an empty reactor for combinations of two different procatalysts and two different external donors. FIG. 1 shows the effect in one embodiment of this invention of increasing the ratio of aluminum from the co-catalyst to titanium from the procatalyst on the yield in the production of a homopolymer (polypropylene). FIG. 1 shows graphs of the torque (Y-axis—in Newton meter) versus the time of polymerization (X-axis in minutes). FIG. 2 shows graphs of the amount of polymer formed (Y-axis in grams) versus the time of polymerization (X-axis in minutes). Figures A shows the graphs of Example 1, Figures B the graphs of Example 2, Figures C the graphs of Example 3, Figures D the graphs of Comparative Example 1, Figures E the graphs of Comparative Example 2, Figures F the graphs of Comparative Example 3. The graphs according to FIG. 1 show that for a higher aluminum/titanium ratio, the increase in torque compared to the torque in an empty reactor is smaller.

Moreover, FIG. 3 shows the graph of the delta Torque (Torque per 100 grams of polymer formed) on the Y-axis versus the Al/Ti ratio (X-axis) for Examples 1, 2, 3 and Comparative Example 1. From this, it can be clearly seen that with the present invention, viz. a Al/Ti ratio of at least 75 a lower delta Torque is obtained—such as a delta Torque of at most 0.6, preferably at most 0.5, more preferably at most 0.4—which clearly shows the effect of the present invention.

Table 1 shows clearly that for the Examples decent homopolymerization is carried out and that the delta torque is decreased upon increase of the Al/Ti ratio.

(Comparative) Example 4

(Comparative) Examples 1 is repeated with the exception that a different procatalyst is used. The catalyst used was synthesized according to procatalyst I in US2016326280. Homopolymerization with fixed H2 concentrations were carried out using DEATES (DiEthyl Amino TriEthoxy Silane) as the external donor in an amount such that the molar ratio of Si from the DEATES to Ti from the procatalyst is 9 mol/mol. TEAL is used as co-catalyst in such an amount that the molar ratio of Al from TEAL to Ti of the procatalyst is as disclosed in the Table below. The polymerization results are shown in Table 2 below and in FIG. 4. The temperature during polymerization is 70° C., the propylene pressure is 20 bar, the H2 concentration is 1%.

TABLE 2

| | Al/Ti (mol/mol) | dT (Nm/100 gr · PP) | H2/C3 (%) | Yield (gram/h · mg cat) | Lumps > 2.8 gr. | BD (gr/100 ml) | MFI (dg/min) | XS (M/M %) |
|---|---|---|---|---|---|---|---|---|
| E4 | 160 | 0.025 | 0.0102 | 17.9 | 0.2 | 43.66 | 11.93 | 1.9 |
| CE4 | 50 | 0.041 | 0.0101 | 9.1 | 0.2 | 41.97 | 9.82 | 1.7 |

FIG. 4 shows the graph of the delta Torque versus the Al/Ti ratio for Example 4 and Comparative Example 4. From this, it can be clearly seen that with the present invention a lower delta Torque is obtained.

(Comparative) Example 5

(Comparative) Example 4 is repeated with the exception that DiBDMS is used as external donor instead of DEATES. Homopolymerization with fixed H2 concentrations were carried out using DiBDMS (Di-iso-Butyl DiEthoxy Silane) as the external donor in an amount such that the molar ratio of Si from the DiBDMS to Ti from the procatalyst is 9 mol/mol. For Comparative Example 5a a different H2/C3 ratio is used than for Comparative Example 5 (see table 3 below). TEAL is used as co-catalyst in such an amount that the molar ratio of Al from TEAL to Ti of the procatalyst is as disclosed in the Table below. The polymerization results are shown in Table 3 below and in FIG. 5. The temperature during polymerization is 70° C., the propylene pressure is 20 bar, the H2 concentration is 1%.

TABLE 1

| | Al/Ti (mol/mol) | dT (Nm/100 gr · PP) | H2/C3 (%) | Yield (gram/h · mg cat) | Lumps > 2.8 gr. | BD (gr/100 ml) | MFI (dg/min) | XS (M/M %) |
|---|---|---|---|---|---|---|---|---|
| E1 | 160 | 0.025 | 0.0101 | 17.5 | 0.2 | 38.78 | 18.24 | 2.1 |
| E2 | 100 | 0.031 | 0.0105 | 18.9 | 0.3 | 38.51 | 16.25 | 1.8 |
| E3 | 75 | 0.034 | 0.0103 | 17.5 | 0.1 | 37.78 | 14.70 | 1.7 |
| CE1 | 50 | 0.099 | 0.0103 | 14.7 | 0 | 37.09 | 14.69 | 2.1 |
| CE2 | 50 | 0.097 | 0.0102 | 15.3 | 0.5 | 37.83 | 15.54 | 1.9 |
| CE3 | 50 | 0.077 | 0.0105 | 14.3 | 0 | 36.52 | 16.25 | 1.8 |

TABLE 3

| | Al/Ti (mol/mol) | dT (Nm/100 gr · PP) | H2/C3 (%) | Yield (gram/h · mg cat) | Lumps > 2.8 gr. | BD (gr/100 ml) | MFI (dg/min) | XS (M/M %) |
|---|---|---|---|---|---|---|---|---|
| E5 | 160 | 0.045 | 0.0105 | 26.4 | 1.6 | 46.37 | 10.56 | 3.4 |
| CE5 | 50 | 0.068 | 0.0103 | 15.3 | 1.6 | 43.62 | 5.0 | 1.1 |
| CE5a | 50 | 0.078 | 0.075 | 18.7 | 0.6 | 41.74 | 73.4 | 4.0 |

FIG. 5 shows the graph of the delta Torque versus the Al/Ti ratio for Example 5 and Comparative Example 5. From this, it can be clearly seen that with the present invention a lower delta Torque is obtained.

Examples 6-7

(Comparative) Examples 1 and 3 are repeated with the exception that DiPDMS is used as external donor instead of DEATES. Homopolymerization with fixed H2 concentrations were carried out using DiBDMS (Di-iso-Butyl DiEthoxy Silane) as the external donor in an amount such that the molar ratio of Si from the DiBDMS to Ti from the procatalyst is 9 mol/mol. TEAL is used as co-catalyst in such an amount that the molar ratio of Al from TEAL to Ti of the procatalyst is as disclosed in the Table below. The polymerization results are shown in Table 4 below and in FIG. 6. The temperature during polymerization is 70° C., the propylene pressure is 20 bar, the H2 concentration is 1%.

TABLE 4

| | Al/Ti (mol/mol) | dT (Nm/100 gr · PP) | H2/C3 (%) | Yield (gram/h · mg cat) | Lumps > 2.8 g. | BD (gr/100 ml) | MFI (dg/min) | XS (M/M %) |
|---|---|---|---|---|---|---|---|---|
| E6 | 160 | 0.026 | 0.0103 | 24.7 | 2.1 | 40.12 | 20.47 | 2.5 |
| E7 | 75 | 0.030 | 0.0103 | 24.7 | 1.1 | 39.63 | 17.44 | 2.6 |
| CE6 | 50 | 0.066 | 0.0104 | 20.1 | 0.3 | 39.40 | 16.30 | 2.9 |

FIG. 6 shows the graph of the delta Torque versus the Al/Ti ratio for Example 6, 7 and Comparative Example 6. From this, it can be clearly seen that with the present invention a lower delta Torque is obtained.

We claim:

1. A process for the continuous production of a polyolefin in a horizontal stirred bed polymerization reactor by contacting one or more olefins with a catalyst system while stirring, said catalyst system comprising:
a procatalyst comprising i) titanium; ii) a magnesium-containing support, and iii) an internal electron donor; optionally an external electron donor; and
a co-catalyst, being an alkyl aluminum catalyst having formula $AlX_nR_{3-n}$, wherein each X is independently a halide or a hydride and wherein n is 0, 1 or 2 and wherein R is an C1-C12 alkyl group,
wherein the molar ratio of aluminum (Al) from the co-catalyst to titanium (Ti) from the procatalyst (Al/Ti) is at least 75,
wherein the internal electron donor comprises an aminobenzoate, a diether, a silyl ester, a succinate and/or combinations thereof; and
the torque per 100 grams of polyolefin formed (dT) is at most 0.05 Newton-meter per 100 gram of polyolefin formed.

2. The process according to claim 1, wherein the molar ratio of aluminum (Al) from the co-catalyst to titanium (Ti) from the procatalyst (Al/Ti) is at least 100.

3. The process according to claim 1, wherein said procatalyst is prepared by a process comprising the steps of:
i) contacting a compound $R^4_zMgX^4_{2-z}$ with an alkoxy- or aryloxy-containing silane compound to give a first intermediate reaction product, being a solid $Mg(OR^1)_xX^1_{2-x}$, wherein: $R^4$ and $R^1$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group consisting of fluoride ($F^-$), chloride ($Cl^-$), bromide ($Br^-$) or iodide ($I^-$); z is in a range of larger than 0 and smaller than 2, being 0<z<2; x is in a range of larger than 0 and smaller than 2, being 0<x<2;
ii) optionally contacting the first intermediate reaction product obtained in step i) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate product; wherein: $M^1$ is a metal selected from the group consisting of Ti, Zr, Hf, Al or Si; $M^2$ is a metal being Si; v is the valency of $M^1$ or $M^2$ respectively; w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; and
iii) contacting the first or second intermediate reaction product, obtained respectively in step i) or ii), with a halogen-containing titanium compound, optionally an activator, and an internal electron donor.

4. The process according to claim 1, wherein an external electron donor is present, said external electron donor being a silane-based external electron donor.

5. The process according to claim 4, wherein said external electron donor is selected from diethyl amino triethoxy silane or di-iso-butyl diethoxy silane.

6. The process according to claim 1, wherein said procatalyst comprises as an internal electron donor.

7. The process according to claim 1, wherein said procatalyst comprises as an activator a monoester or a benzamide.

8. The process according to claim 3, wherein in the process to prepare said procatalyst in step i) a Grignard compound is used wherein $R^4$ is butyl or phenyl.

9. The process according to claim 1, wherein the torque per 100 grams of polyolefin formed (dT) is at most 0.04 Newton-meter per 100 grams of polyolefin formed.

10. The process according to claim 1, wherein as co-catalyst triethyl aluminum (TEAL) is used.

11. The process according to claim 1, wherein as a procatalyst a procatalyst is used comprising in wt. % based on the total weight of the procatalyst: magnesium: from 13 to 24; titanium: from 1 to 5.

12. The process according to claim 1, wherein said polyolefin is polypropylene.

13. The process according to claim 1, wherein the molar ratio of aluminum (Al) from the co-catalyst to titanium (Ti) from the procatalyst (Al/Ti) is at least 125, and the torque per 100 grams of polyolefin formed (dT) is at most 0.03 Newton-meter per 100 gram of polyolefin formed.

14. The process according to claim 1, wherein the molar ratio of aluminum (Al) from the co-catalyst to titanium (Ti) from the procatalyst (Al/Ti) is at least 125.

15. A process for the continuous production of a polyolefin in a horizontal stirred bed polymerization reactor by contacting one or more olefins with a catalyst system while stirring, said catalyst system comprising:

a procatalyst comprising i) titanium; ii) a magnesium-containing support, and iii) an internal electron donor; optionally an external electron donor; and a co-catalyst, being an alkyl aluminum catalyst having formula $AlX_nR_{3-n}$, wherein each X is independently a halide or a hydride and wherein n is 0, 1 or 2 and wherein R is an C1-C12 alkyl group, wherein the molar ratio of aluminum (Al) from the co-catalyst to titanium (Ti) from the procatalyst (Al/Ti) is at least 75 for limiting the increase in the torque of the stirrer, wherein the internal electron donor comprises an amino-benzoate, a diether, a silyl ester, a succinate and/or combinations thereof; and the torque per 100 grams of polyolefin formed (dT) is at most 0.04 Newton-meter per 100 gram of polyolefin formed.

16. The process according to claim 15, wherein the molar ratio of aluminum (Al) from the co-catalyst to titanium (Ti) from the procatalyst (Al/Ti) is at least 100.

17. The process according to claim 15, wherein the molar ratio of aluminum (Al) from the co-catalyst to titanium (Ti) from the procatalyst (Al/Ti) is at least 125, and the torque per 100 grams of polyolefin formed (dT) is at most 0.03 Newton-meter per 100 gram of polyolefin formed.

* * * * *